Figure 1:
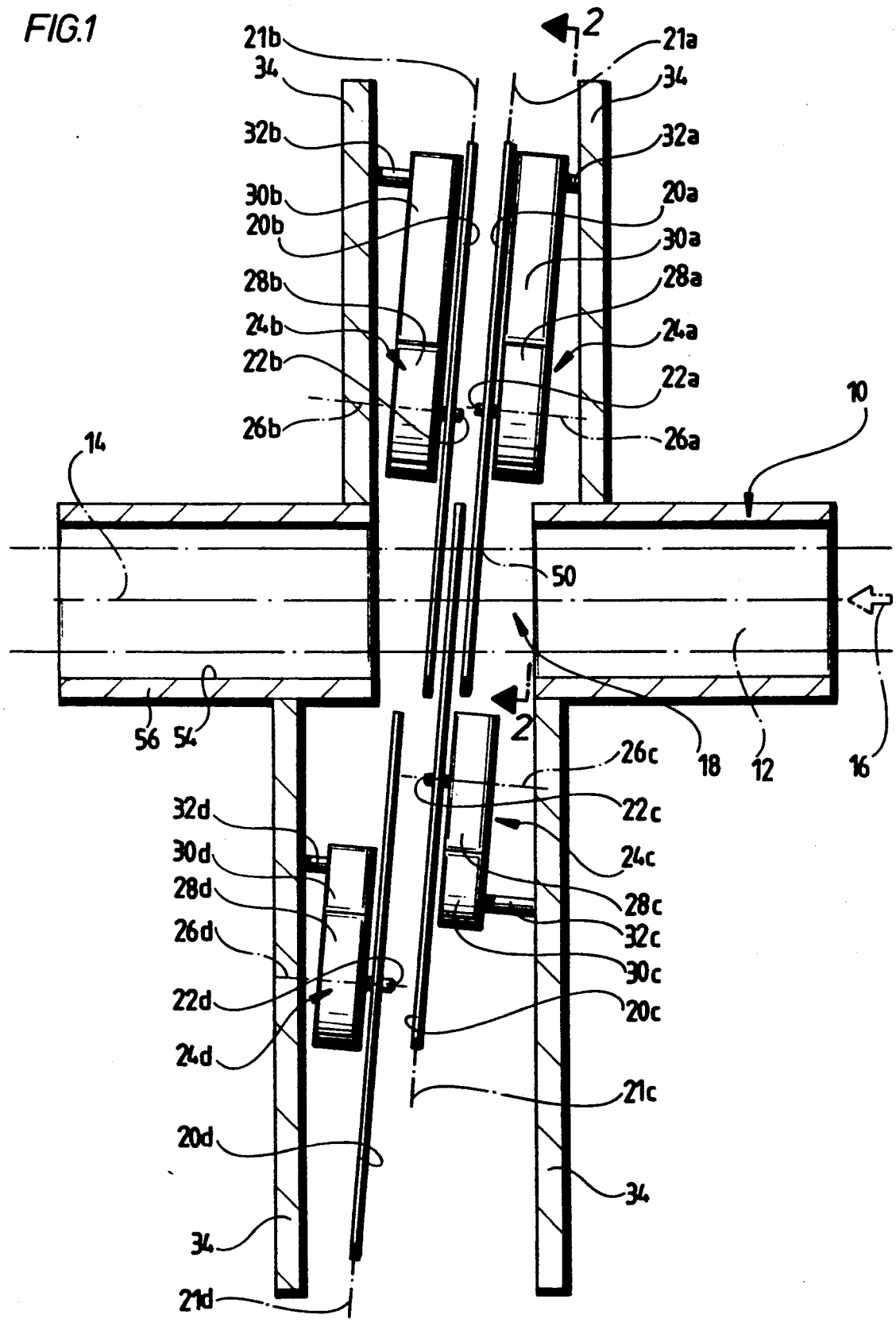

United States Patent [19]

Schnee et al.

[11] Patent Number: 5,202,794
[45] Date of Patent: Apr. 13, 1993

[54] ATTENUATOR FOR A LASER BEAM

[75] Inventors: Peter Schnee, Stuttgart; Thomas Hall, Wildberg, both of Fed. Rep. of Germany

[73] Assignee: Deutsche Forschungsanstalt fuer Luft- und Raumfahrt e.V., Bonn, Fed. Rep. of Germany

[21] Appl. No.: 640,373

[22] PCT Filed: May 30, 1990

[86] PCT No.: PCT/EP90/00865
§ 371 Date: Mar. 18, 1991
§ 102(e) Date: Mar. 18, 1991

[87] PCT Pub. No.: WO90/15348
PCT Pub. Date: Dec. 13, 1990

[30] Foreign Application Priority Data

Jun. 3, 1989 [DE] Fed. Rep. of Germany ....... 3918197

[51] Int. Cl.$^5$ .............................................. G02B 27/44
[52] U.S. Cl. ...................................... 359/568; 359/572
[58] Field of Search ............... 359/566, 568, 569, 572; 372/102

[56] References Cited

U.S. PATENT DOCUMENTS 4,167,666  9/1979  Miller et al. .
4,560,252  12/1985  Mori .
4,561,721  12/1985  Keilmann et al. .

FOREIGN PATENT DOCUMENTS 0115874  8/1984  European Pat. Off. .

Primary Examiner—Bruce Y. Arnold
Assistant Examiner—J. P. Ryan
Attorney, Agent, or Firm—Barry R. Lipsitz

[57] ABSTRACT

In order to improve an attenuator for a laser beam of a high-power laser comprising a diffraction element which in an attenuating position extends in a section oriented transversely to a beam direction of the laser beam and is irradiated by the laser beam such that it will also withstand the laser beams of high-power lasers, it is proposed that the diffraction element extend beyond the laser beam in the direction transverse to the beam direction so only a partial region of the diffraction element is irradiated by the laser beam and that the diffraction element be continuously moveable in this direction by a drive such that the laser beam irradiates constantly changing partial regions of the diffraction element.

20 Claims, 3 Drawing Sheets

ATTENUATOR FOR A LASER BEAM

The invention relates to an attenuator for a laser beam of a high-power laser comprising a diffraction element which in an attenuating position extends in an area oriented transversely to a beam direction of the laser beam and is irradiated by the laser beam.

It is known from U.S. Pat. No. 4,561,721 to attenuate a laser beam by introducing diffraction elements into the latter and aligning these such that the diffracted laser radiation propagating in the beam direction exhibits a considerably lower intensity than the original laser radiation in order to then determine this by a measuring technique.

Such an attenuator has the disadvantage that the laser beam of a high-power laser heats the diffraction element up so strongly that additional cooling measures, for example, in the form of air cooling, have to be taken, but, in many cases, these are insufficient to protect the diffraction element against thermal destruction owing to excessive heating-up by the laser beam.

The object underlying the invention is, therefore, to so improve an attenuator of the generic kind that it will also withstand the laser beams of high-power lasers.

This object is accomplished in accordance with the invention with an attenuator of the kind described at the beginning by the diffraction element extending beyond the laser beam in the direction transverse to the beam direction so only a partial region of the diffraction element is irradiated by the laser beam and by the diffraction element being continuously moveable in this direction by a drive such that the laser beam irradiates constantly changing partial regions of the diffraction element.

The advantage of the inventive solution lies in the fact that owing to the irradiated partial regions constantly changing, the partial regions which are not irradiated have an opportunity to cool down, thereby avoiding heating-up, and so one can work at the power customary for high-power lasers without additional cooling. It is, at any rate, ensured that with additional cooling, the diffraction element will also withstand the substantially higher power of future high-power lasers.

It is particularly advantageous within the scope of the present invention for the movement of the diffraction element to take place periodically so the individual partial regions that are irradiated change constantly with respect to time, which results in a uniform, mean thermal load on the partial regions.

In a particularly preferred embodiment of the inventive solution, provision is made for the diffraction element to be rotatable about an axis arranged beside the laser beam and to be made to rotate by the drive, and for the partial regions that are alternately irradiated by the laser beam to lie in a ring which is coaxial with the axis. This embodiment of the inventive solution is particularly advantageous because it is thus made possible in a very simple way for all of the partial regions to be irradiated on average with the same thermal power and, in addition, to have on average the same time for cooling down again.

An embodiment of the inventive solution has proven particularly advantageous wherein the diffraction element is moveable from an ineffective position into the attenuating position and so, in particular, where there are several diffraction elements, a different number of diffraction elements can be selectively moved into the laser beam. Structurally, the simplest way to implement this is for the diffraction element to be held on a pivot arm.

To simultaneously enable the diffraction element to be driven in a simple way, it is expedient for the drive to be held on the pivot arm so there is no need for a complicated transmission of the drive onto the diffraction element held on the pivot arm.

The simplest way to implement the drive for rotating the diffraction element is for the diffraction element to be seated on a motor shaft of a motor acting as drive.

The simplest possibility of designing the diffraction element is that of the diffraction element having the shape of a circular disc as, in this case, it can be driven rotatingly in a non-oscillating manner.

The diffraction element itself is preferably in the form of a metal grating.

Since use of a single diffraction element is usually not sufficient, provision is made in a conception which is particularly well suited for practical purposes for several diffraction elements to be spaced apart in the beam direction.

Provision is preferably made for different diffraction elements to extend in different areas which are oriented at a different angle differing from 90 degrees transversely to the beam direction.

Moreover, provision is expediently made for an area to be a plane standing perpendicular to the axis.

In the case of several different diffraction elements, it has proven particularly advantageous for the areas of successive diffraction elements to lie in lateral areas of a cone oriented coaxially with the axis with a different apex angle. This enables, in a simple way, tilting of the areas relative to one another in which the diffraction elements are to stand.

Finally, it is advantageous for the directions of the periodicity of different diffraction elements to differ from one another. This is necessary in order to prevent a diffraction maximum diffracted out of the beam direction from being diffracted back into the beam direction again.

In particular when there are several diffraction elements, in order that the directions of the periodicity will not be identical at least at times in the course of the movements, but the different directions once fixed relative to one another will be maintained, provision is advantageously made for the diffraction elements to be driven in synchronism with one another. On the one hand, this can be implemented in a particularly advantageous way by the diffraction elements being seated on a shaft. As an alternative to this, in particular when there are several drives, it is advantageous for the drives to be synchronous drives which can be synchronized with one another by a control means.

In a particularly preferred embodiment of the inventive attenuator, provision is made for it to include a channel with an opening which the diffraction element enters.

Herein, it is particularly advantageous for the channel to comprise an inside wall surface made of material which absorbs the laser beam as the diffraction maximums strike it and should, if possible, not be reflected back from it.

Figure 2:
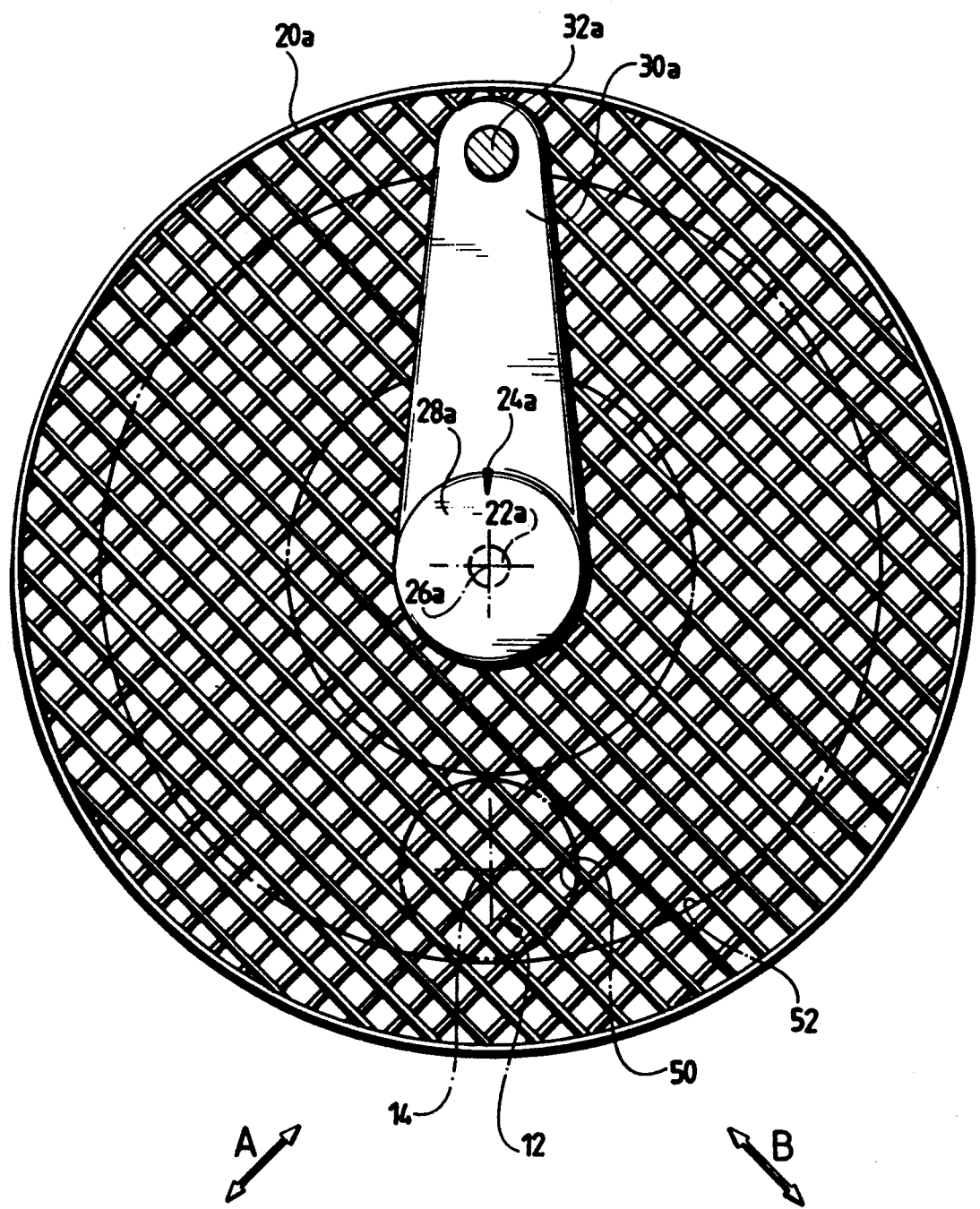

Further features and advantages of the present invention are the subject matter of the following description and the drawings of several embodiments. The drawings show:

FIG. 1 a partly sectional plan view of a first embodiment;

FIG. 2 a view along line 2—2 in FIG. 1; and

Figure 3:
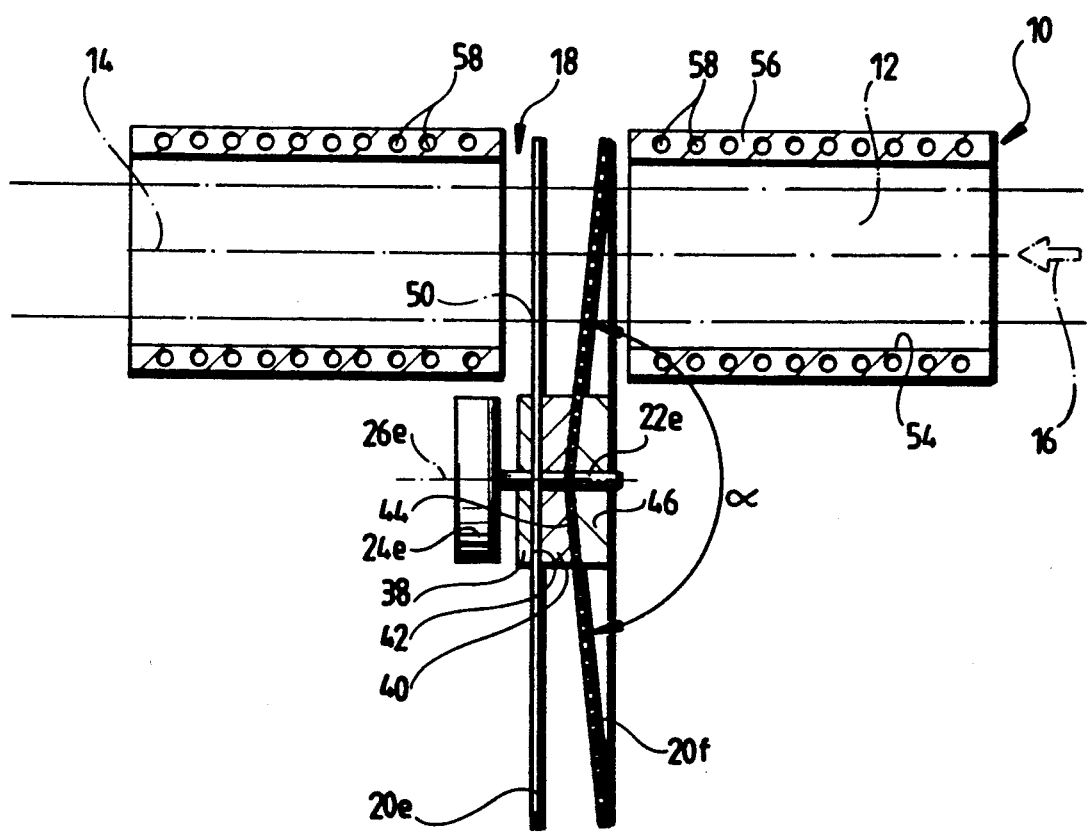

FIG. 3 a partly sectional plan view of a second embodiment.

A first embodiment of an inventive attenuator, illustrated in FIG. 1, comprises a channel 10 through which a laser beam 12 extends with a beam direction 16 oriented parallel to a channel axis 14 preferably coaxially with the channel axis 14. The channel 10 is interrupted by an opening 18 and so the laser beam 12 extends freely in this opening 18.

Circular disc-shaped diffraction elements 20a, b, c and d are insertable so far into the opening 18 that they are respectively irradiated by the laser beam 12 with its entire cross-sectional area. The diffraction elements 20a-c are then standing in the attenuating position, while the diffraction element 20d is in an ineffective position. These diffraction elements 20a-d are respectively held in a rotationally fixed manner on motor shafts 22a-d of drive motors 24a-d and can be made to rotate by the drive motors 24a-d about axes 26a-d respectively located at the side of the channel axis 14. To make the diffraction elements 20a-d pivotable into the opening 18, the drive motors 24a-d are respectively held with their housing 28a to d fixedly on a pivot arm 30a-d which, for its part, is rotatable about a pin 32a-d. This pin 32a-d is respectively held on a carrier plate 34 connected to the channel 10.

By pivoting the arms 30a-d about the pins 32a-d, the diffraction elements 20a-d can be pivoted into the laser beam 12.

The diffraction elements 20a-d are preferably circular discs which extend in a plane 21a-d. The plane stands perpendicular on the axis 26a but not perpendicular to the beam direction 16, but instead is inclined to the beam direction 16 at an angle deviating slightly from a right angle. It is expedient for all diffraction elements 20a-d to be arranged in spaced relation to one another in the beam direction 16 and to be pivotable about pins 32a-d so each of the diffraction elements 20a-d is pivotable independently of the other diffraction elements 20a-d from the attenuating position to the ineffective position and vice-versa.

As shown in the enlarged illustration in FIG. 2, the diffraction elements are of periodically diffracting design in two different directions A and B of the plane in which the respective diffraction element 20a-d lies. Each of the diffraction elements 20a-d is periodic relative to the other diffraction element 20a-d in its attenuating position pivoted into the laser beam 12, as illustrated in FIG. 1 with the diffraction elements 20a-c, in directions A and B deviating from one another.

Examples of diffraction elements and of the relative orientation of these diffraction elements to one another are illustrated in U.S. Pat. No. 4,561,721, to the contents of which reference is made in full.

In the simplest case, the diffraction elements 20a-d, as illustrated in FIG. 2, are metal gratings with a periodicity of the order of magnitude of from one to ten times the wavelength of the laser beam 12.

To ensure that the directions A and B of the periodicity of the individual diffraction elements 20a-d relative to one another are not identical at times during the driving of the diffraction elements 20a-d, provision is expediently made for the drive motors 24a-d to be driven in synchronism with one another, i.e., in the simplest case, to be synchronous motors so that by means of an originally different orientation of the diffraction elements 20a-d relative to one another, this orientation is maintained throughout operation of the inventive attenuator.

In a second embodiment of the inventive attenuator, illustrated in FIG. 3, insofar as the same parts are used, these bear the same reference numerals, and so reference is to be had to the statements on the first embodiment for a description of these.

In contrast with the first embodiment, there is only one drive motor 24e with a total of two diffraction elements 20e and f mounted on the motor shaft 22e thereof. The diffraction element 20e represents a flat, circular disc corresponding to the diffraction element 20a in FIG. 2, while the diffraction element 20f lies in the lateral area of a cone with the axis of the cone extending coaxially with the axis 26e of the motor shaft 22e and an angle α at the apex of the cone being slightly less than 180 degrees. This already ensures that the diffraction elements 20e and f do not lie in parallel planes relative to one another.

At the same time, assembly of the diffraction elements 20e and f on the motor shaft 22e ensures that their directions of the periodicity differ from one another.

As illustrated in FIG. 3, the diffraction elements 20e and f are preferably assembled on the motor shaft 22e such that the diffraction element 20e lies between two clamping elements 38 and 40 which respectively exhibit a clamping surface 42 extending perpendicular to the axis 26e, while the clamping element 40 additionally exhibits a clamping surface 44 which lies on the lateral area of a cone and against which the diffraction element 20f is pressed by means of a further clamping element 46 likewise with the lateral area of a cone as clamping surface 44 and hence is likewise oriented parallel to this lateral area of a cone.

In all of the embodiments of diffraction elements 20a-f described hereinabove—as illustrated by way of example in the diffraction element 20a in FIG. 2—only a partial region 50 of the respective diffraction element 20a-f corresponding in shape to the cross-section of the laser beam 12 is irradiated by the laser beam 12, with the rotation of the diffraction element 20a-f resulting in the partial regions 50 being elements of a circular ring 52 extending concentrically about the respective axis 26a-e.

Owing to the fact that successive partial regions 50 of the circular ring 52 are irradiated by the diffraction elements 20a-f rotating, these can cool down so long as they are not irradiated, whereby destruction of the diffraction elements 20a-f at a high temperature is avoided.

Provision is preferably also made for inside wall surfaces 54 of the channel 10 to be of highly absorbent design as the laser radiation diffracted by the diffraction elements 20a-f has to be absorbed as completely as possible by these wall surfaces 54. For this purpose, all of the walls 56 of the channel 10 are preferably penetrated—as illustrated in FIG. 3—by cooling channels 58 for cooling these. As an alternative to this, it is, however, also possible for air to be blown against the walls 56 to cool these, for which purpose, for example, the motor shafts 26a-e may also respectively carry a fan wheel.

We claim:

1. An attenuator for a laser beam of a high-power laser comprising:

a diffraction element moveable from an ineffective position into an attenuating position in which the diffraction element extends in a section oriented transversely to a beam direction of said laser beam and is irradiated by said laser beam, said diffraction element in said attenuating position extending beyond said laser beam in the direction transverse to said beam direction so that only a partial region of said diffraction element is irradiated by said laser beam, and said diffraction element in said attenuating position being continuously moveable in said transverse direction by a drive such that said laser beam irradiates constantly changing partial regions of said diffraction element.

2. An attenuator as defined in claim 1, characterized in that the movement of said diffraction element takes place periodically.

3. An attenuator as defined in claim 1, characterized in that said diffraction element is rotatable about an axis arranged beside said laser beam and is made to rotate by said drive, and in that said partial regions that are alternately irradiated by said laser beam lie in a ring which is coaxial with said axis.

4. An attenuator as defined in claim 1, characterized in that said diffraction element is held on a pivot arm.

5. An attenuator as defined in claim 4, characterized in that said drive is held on said pivot arm.

6. An attenuator as defined in claim 1, characterized in that said diffraction element is seated on a motor shaft of a motor acting as drive.

7. An attenuator as defined in claim 1, characterized in that said diffraction element has the shape of a circular disc.

8. An attenuator as defined in claim 1, characterized in that said diffraction element is a metal grating.

9. An attenuator as defined in claim 1, characterized in that several diffraction elements moveable from an ineffective position into an attenuating position spaced in said beam direction are provided.

10. An attenuator as defined in claim 9, characterized in that different diffraction elements extend in different areas which are oriented at a different angle differing from 90 degrees transversely to said beam direction.

11. An attenuator as defined in claim 1, characterized in that said attenuator includes a channel with an opening which said diffraction element enters.

12. An attenuator for a laser beam of a high-power laser comprising:

a plurality of diffraction elements spaced along a beam direction of said laser beam, each of which in an attenuating position extends in a section oriented transversely to said beam direction and is irradiated by said laser beam, said diffraction elements extending beyond said laser beam in the direction transverse to said beam direction so that only a partial region of said diffraction element is irradiated by said laser beam, and said diffraction element being continuously moveable in said transverse direction by a drive such that said laser beam irradiates constantly changing partial regions of said diffraction element.

13. An attenuator as defined in claim 12, characterized in that different diffraction elements extend in different areas which are oriented at a different angle differing from 90 degrees transversely to said beam direction.

14. An attenuator as defined in claim 13, characterized in that an area is a plane standing perpendicular to an axis of rotation of a corresponding diffraction element.

15. An attenuator as defined in claim 13, characterized in that said areas of successive diffraction elements are lateral areas of a cone oriented coaxially with an axis of rotation of the corresponding diffraction element with a different apex angle ($\alpha$).

16. An attenuator as defined in claim 12, characterized in that said diffraction elements are driven in synchronism with one another.

17. An attenuator as defined in claim 16, characterized in that said diffraction elements (20e, f) are seated on a common shaft (22e).

18. An attenuator as defined in claim 16, characterized in that said drives (24a-d) are synchronous drives which are coupled with one another.

19. An attenuator for a laser beam of a high-power laser comprising:

a diffraction element which in an attenuating position extends into an opening in a channel where it is oriented transversely to a beam direction of said laser beam and is irradiated by said laser beam, said diffraction element extending beyond said laser beam in the direction transverse to said beam direction so that only a partial region of said diffraction element is irradiated by said laser beam, and said diffraction element being continuously moveable in said transverse direction by a drive such that said laser beam irradiates constantly changing partial regions of said diffraction element.

20. An attenuator as defined in claim 19, characterized in that said channel (10) comprises an inside wall surface (54) made of material which absorbs said laser beam.

* * * * *